United States Patent
Benouali et al.

(10) Patent No.: US 9,803,896 B2
(45) Date of Patent: Oct. 31, 2017

(54) HEAT CONDITIONING SYSTEM FOR A MOTOR VEHICLE

(75) Inventors: Jugurtha Benouali, Clamart (FR); Klaus Wittmann, Le Mensil Saint Denis (FR); Stefan Karl, Fourqueux (FR)

(73) Assignee: VALEO SYSTEMES THERMIQUES, Le Mensil Saint Denis (FR)

( * ) Notice: Subject to any disclaimer, the term of this patent is extended or adjusted under 35 U.S.C. 154(b) by 669 days.

(21) Appl. No.: 13/704,736

(22) PCT Filed: Jun. 14, 2011

(86) PCT No.: PCT/EP2011/059827
§ 371 (c)(1),
(2), (4) Date: Feb. 25, 2013

(87) PCT Pub. No.: WO2011/157700
PCT Pub. Date: Dec. 22, 2011

(65) Prior Publication Data
US 2013/0146251 A1   Jun. 13, 2013

(30) Foreign Application Priority Data
Jun. 17, 2010 (FR) ..................... 10 02571

(51) Int. Cl.
*B60H 1/00* (2006.01)
*F25B 29/00* (2006.01)

(52) U.S. Cl.
CPC ....... *F25B 29/003* (2013.01); *B60H 1/00278* (2013.01); *B60H 1/00385* (2013.01);
(Continued)

(58) Field of Classification Search
CPC .............. F25B 29/003; B60H 1/00278; B60H 1/00385; B60H 1/00271; B60H 2001/00949; B60H 2001/00307
(Continued)

(56) References Cited

U.S. PATENT DOCUMENTS

2004/0221596 A1* 11/2004 Hille .................. B60H 1/00371
62/244
2005/0178148 A1* 8/2005 Hsu ........................ B60H 1/004
62/498
(Continued)

FOREIGN PATENT DOCUMENTS

DE   EP 2301777 A1 *  3/2011 ......... B60H 1/00278
FR      2821038 A1      8/2002
(Continued)

OTHER PUBLICATIONS

English language abstract for FR 2821038 extracted from espacenet.com database on Feb. 28, 2013, 11 pages.
(Continued)

*Primary Examiner* — Claire Rojohn, III
(74) *Attorney, Agent, or Firm* — Howard & Howard Attorneys PLLC (57) ABSTRACT

The present invention relates to a heat conditioning system for a motor vehicle, including: an air conditioning loop of a motor vehicle (B) in which a cooling fluid circulates and which includes a compressor (2), at least two heat exchangers (8,42) and at least one decompression device (24,26), a heat processing unit (U) of a battery (100) of the vehicle, which unit includes a heat processing means (46) which is capable of being in a heat exchange relation with the battery of the vehicle, in which the heat processing means is in a heat exchange relation with the air conditioning loop.

7 Claims, 9 Drawing Sheets

(52) U.S. Cl.
CPC .............. *B60H 1/00271* (2013.01); *B60H 2001/00307* (2013.01); *B60H 2001/00949* (2013.01)

(58) Field of Classification Search
USPC .................................. 62/259.2, 239; 165/42
See application file for complete search history.

(56) References Cited

U.S. PATENT DOCUMENTS

| | | | | |
|---|---|---|---|---|
| 2005/0183433 | A1* | 8/2005 | Kubo | B60H 1/3205 62/228.1 |
| 2009/0130513 | A1* | 5/2009 | Tsuchiya | B60H 1/00385 429/412 |
| 2009/0176150 | A1* | 7/2009 | Yanaka | B60H 1/00278 429/120 |
| 2009/0249802 | A1* | 10/2009 | Nemesh | B60H 1/00278 62/56 |
| 2009/0249807 | A1* | 10/2009 | Nemesh | B60H 1/00278 62/117 |
| 2011/0136424 | A1* | 6/2011 | Park | B60H 1/00278 454/75 |
| 2011/0139397 | A1* | 6/2011 | Haussmann | B60H 1/00278 165/43 |
| 2012/0222438 | A1* | 9/2012 | Osaka | B60H 1/00271 62/126 |
| 2013/0140001 | A1* | 6/2013 | Mandl | F28F 27/02 165/96 |

FOREIGN PATENT DOCUMENTS

| | | | | |
|---|---|---|---|---|
| FR | 2865070 | A1 * | 7/2005 | ......... B60H 1/00278 |
| FR | 2884058 | A * | 6/2006 | |
| FR | 2884058 | A1 | 10/2006 | |

OTHER PUBLICATIONS

English language abstract for FR 2865070 extracted from espacenet.com database on Feb. 28, 2013, 16 pages.
English language abstract for FR 2884058 extracted from espacenet.com database on Feb. 28, 2013, 38 pages.
International Search Report for Application No. PCT/EP2011/059827 dated Aug. 8, 2011, 6 pages.

* cited by examiner

HEAT CONDITIONING SYSTEM FOR A MOTOR VEHICLE

RELATED APPLICATIONS

This application is the National Stage of International Patent Application No. PCT/EP2011/059827, filed on Jun. 14, 2011, which claims priority to and all the advantages of French Patent Application No. FR 10/02571, filed on Jun. 17, 2010, the content of which is incorporated herein by reference.

FIELD OF THE INVENTION

The invention relates to the field of electric vehicles and, more particularly, to the heat conditioning systems of such vehicles.

DESCRIPTION OF THE RELATED ART

Since electric vehicles no longer have a heat engine, the vehicle passenger compartment heating function is no longer performed by a heat radiator in which the coolant of the heat engine circulates.

One proposed solution is to use electric heating devices, such as electric radiators, instead of the heat radiator. This solution presents the drawback of consuming the electrical energy of the battery of the vehicle, thus reducing the range of the vehicle between refills.

In order to reduce the electrical consumption of the battery of the vehicle and to provide heating for the vehicle passenger compartment, it has been proposed to use an air conditioning loop operating in heat pump mode. As is known, the air conditioning loop comprises a compressor, a condenser, a decompression device and an evaporator and conventionally makes it possible to cool an air stream passing through an air conditioning installation of the vehicle via the evaporator. In the present case, the air conditioning loop is used in such a way as to supply heat to the air stream passing through the air conditioning installation. To do this, the air conditioning loop is used in such a way that the evaporator operates as a condenser and reheats the air stream passing through it. However, the use of the air conditioning loop in heat pump mode is not completely satisfactory since the performance levels in heat pump mode depend on the outside climatic conditions.

More specifically, in winter climatic conditions, the outside air temperature is too low for this outside air to be used as a source of heat energy for the air conditioning loop operating in heat pump mode. In fact, the use of the outside air as source of heat energy in winter conditions causes icing problems for the heat exchanger in which the fluid is evaporated.

This icing leads to a drop in the performance coefficient of the air conditioning loop and necessitates an input of additional energy to deice the iced-up heat exchanger and return to a satisfactory performance coefficient value. Finally, when the temperature of the outside air is extremely low (for example −20° C.), the heat energy of this outside air is insufficient to produce the thermodynamic cycle of the air conditioning loop fluid.

In parallel, the temperature of the battery of the electric vehicle must be as constant as possible in order to avoid reducing its life span. For this, it is necessary to have both a source to reheat the battery when the outside temperature is low and a source to cool the battery when the outside temperature is high. The source for the reheating of the battery can be an electric heating device or a water circuit transporting heat from the air conditioning loop.

However, these solutions are not ideal. In practice, either the vehicle comprises an electric heating device to heat the battery and an additional electric heating device to heat the air of the passenger compartment, or the vehicle comprises an electric heating device for the battery and a water circuit for heating the passenger compartment. Now, the proliferation of the electric heating devices consumes the electrical energy of the battery and the water circuit increases the bulk of the vehicle and represents an additional cost.

There is therefore a need to manage both the heat conditioning of the battery of the electric vehicle in order to prolong its life span and the heat conditioning of the passenger compartment of the vehicle in order to ensure heat comfort for the passengers of the electric vehicle without in any way reducing the range of the vehicle between refills.

SUMMARY OF THE INVENTION

The invention provides a solution to this problem by proposing a heat conditioning system for a motor vehicle comprising:
- an air conditioning loop in which a coolant circulates and comprising a compressor, at least two heat exchangers and at least one decompression device,
- a heat treatment unit for a battery of the vehicle comprising a heat treatment means capable of exchanging heat with the battery of the vehicle. The heat conditioning system is characterized by the heat treatment means exchanging heat with the air conditioning loop.

With this system, the heat conditioning of the battery is ensured by the combination of the electric heating device and the air conditioning loop and this same electric heating device is used jointly with the air conditioning loop for the heat conditioning of the passenger compartment of the vehicle. Furthermore, this heat conditioning system makes it possible to dispense with the use of a bulky and costly water circuit for heating the air of the passenger compartment. The weight saving for the heat conditioning system is also obtained through the elimination of the water circuit. Furthermore, this heat conditioning system makes it possible to reduce the bulk of the heat treatment unit.

Advantageously:
- the heat treatment means is separate from the air conditioning loop,
- the heat treatment means exchanges heat with one of the at least two heat exchangers.
- the heat exchange between the heat treatment means and one of the at least two heat exchangers is performed via a blower.
- the heat exchanger exchanging with the heat treatment means is located inside the heat treatment unit.
- the heat treatment means is in contact with the air conditioning loop.
- the heat treatment means is in contact with one of the at least two heat exchangers.
- the heat exchanger in contact with the heat treatment means is an evaporator.
- one of the at least two heat exchangers is a condenser linked to the battery.
- the heat treatment means is situated upstream in the direction of travel of the coolant of the condenser.
- the heat treatment means is situated downstream of the condenser.
- an additional heat treatment means is in contact with the air conditioning loop.

the additional heat treatment means is situated upstream of an internal condenser.

the heat treatment means is an electric heating device.

The invention also relates to a heat management method for a heat conditioning system as claimed in any one of the preceding claims and of an air conditioning installation of a vehicle, in which it comprises the following steps:

implementation of the heat treatment means implementation of the air conditioning installation in recycling mode implementation of the air conditioning loop measurement of the air temperature of the vehicle passenger compartment reduction of the electrical consumption of the heat treatment means when the passenger compartment air temperature increases.

BRIEF DESCRIPTION OF THE DRAWINGS

Other features, details and advantages of the invention will become more clearly apparent on reading the description given hereinbelow as an indication in relation to the drawings in which.

DETAILED DESCRIPTION

Figure 1:
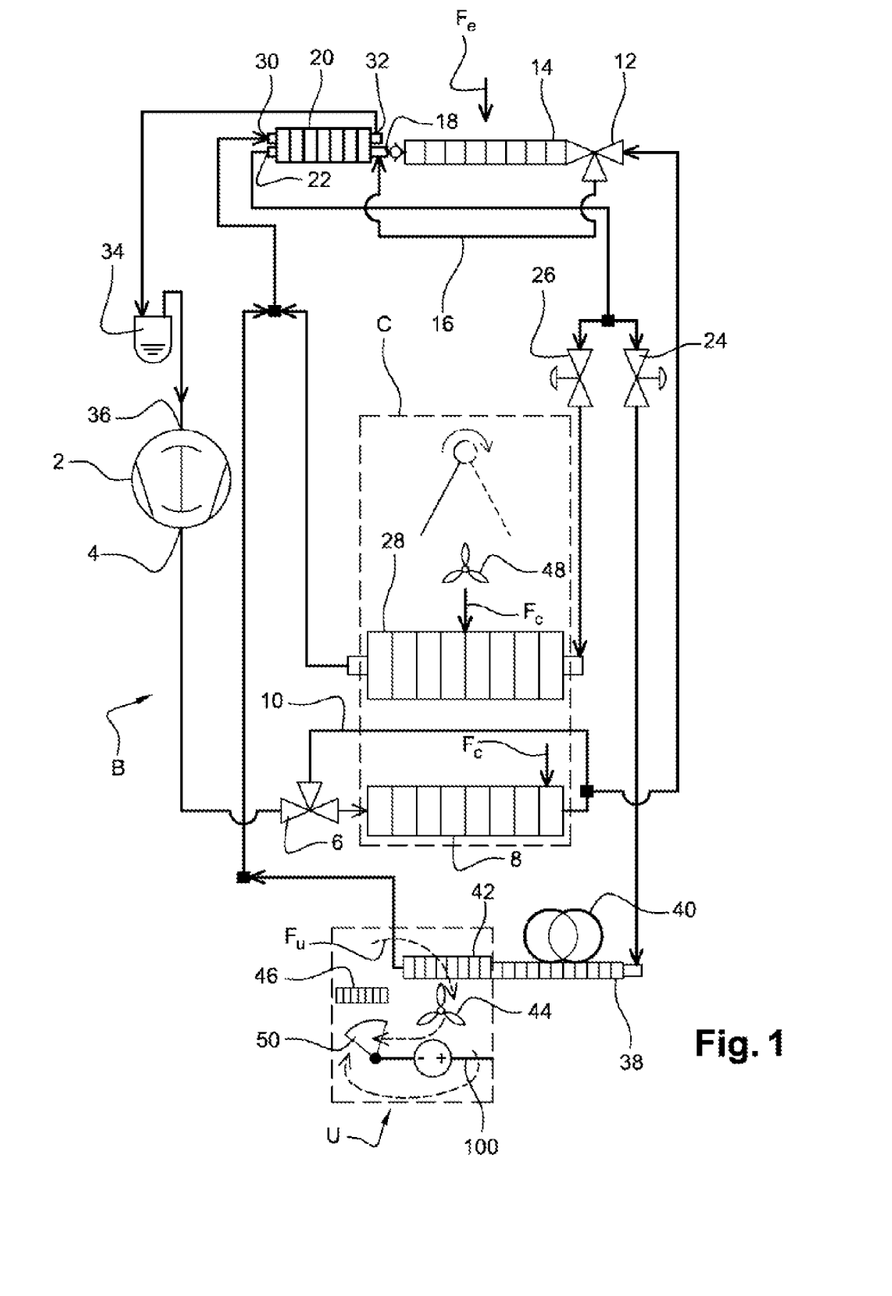
FIG. 1 represents a first embodiment of a heat conditioning system according to the invention

FIG. 1 represents a schematic view of a heat conditioning system of an electric vehicle according to the invention.

The heat conditioning system comprises an air conditioning loop B and a heat treatment unit U for a battery 100 of the vehicle.

This air conditioning loop B comprises a compressor, at least two heat exchangers and at least one decompression device. The compressor is an electric compressor 2 in which a coolant is compressed. The electric compressor 2 comprises an output 4 through which the coolant at high pressure and high temperature is expelled to reach a first three-way valve 6. An input of a heat exchanger, called internal condenser 8, is linked to one of the two outputs of the first three-way valve 6, this internal condenser 8 being located inside an air conditioning installation C. The other output of the first three-way valve 6 leads to a bypass channel 10 ending at an output of the internal condenser 8. Thus, it is possible for the coolant from the electric compressor 2 to bypass the internal condenser 8 and not pass through it.

The output of the internal condenser 8 is linked to a second three-way valve 12, an output of which is linked to an input of a heat exchanger, called external condenser 14, and another output of which is linked to a bypass duct 16. The external condenser 14 is located inside the electric vehicle at the front end of the vehicle and is passed through by an air stream Fe from outside. An output of the external condenser 14 is linked to a first input 18 of an internal heat exchanger 20. The bypass duct 16 is linked to the first input 18 of the internal heat exchanger 20. Thus, the bypass duct 16 allows the coolant to bypass the external condenser 14 and not pass through it. The coolant then passes directly from the second three-way valve 12 to the first input 18 of the internal heat exchanger 20. The coolant, still at high pressure and passing through the internal heat exchanger 20, leaves the latter through the first output 22 of the internal heat exchanger 20 to reach two decompression devices 24, 26. The two decompression devices 24, 27 are mounted in parallel with one another.

A first decompression device 24 is linked to a heat exchanger, called inverter evaporator 38. The inverter evaporator 38 handles the cooling of an inverter 40 electrically controlling the battery 100. Another heat exchanger, called battery exchanger 42, is linked to the inverter evaporator 38 and makes it possible to cool an air stream Fu passing through it, this air stream Fu circulating inside the heat treatment unit U. In other words, the battery exchanger behaves as an evaporator. The duly cooled air stream Fu reaches the battery 100 via a blower 44 and makes it possible to lower its temperature. The battery exchanger 42 is linked to the second input 30 of the internal heat exchanger 20. The coolant passing through the first evaporator 42 therefore reaches the internal heat exchanger 20 then the accumulator 34 and finally the compressor 2.

A second decompression device 26 is linked to a heat exchanger, called internal evaporator 28. Located inside the air conditioning system C, the internal evaporator 28 is passed through by the coolant in the low pressure and low temperature state from the second decompression device 26. At the output of the internal evaporator 28, the coolant circulates to a second input 30 of the internal heat exchanger 20. The coolant, at low pressure, passes through the internal heat exchanger 20 to exchange heat with the coolant at high pressure circulating between the first input 18 and the first output 22. The coolant at low pressure leaves the internal heat exchanger 20 via a second output 32 to reach an accumulator 34. An input 36 of the electric compressor 2 is linked to the output of the accumulator 34.

The heat treatment unit U also comprises a heat treatment means. In this embodiment, the heat treatment means is an electric heating device 46. For example, this electric heating device 46 is formed by positive temperature coefficient resistive elements. When necessary, the air stream Fu set in motion by the blower 34 passes through the electric heating device 46, is reheated and then reaches the battery 100 to heat it. In order to ensure optimum heat management of the battery 100, the heat treatment unit 100 is thermally insulated from the rest of the vehicle. For this, the heat treatment unit comprises, for example, an adiabatic chamber. A flap 50 situated inside the heat treatment unit U makes it possible to distribute the air stream Fu either to the electric heating device 46 or to the first evaporator 42.

The implementation of the heat conditioning system will now be described.

In summer climatic conditions, it is necessary to cool the battery 100 and the passenger compartment of the vehicle. For this, the air conditioning loop is used. The electric compressor 2 is implemented and compresses the coolant. At the output of the compressor, the coolant is then at high pressure and high temperature. The first three-way valve 6 is open so as to cause the fluid to circulate toward the bypass channel 10. Access to the internal condenser 8 is then prevented. The coolant then reaches the second three-way valve 12 which allows passage to the external condenser 14. Access to the bypass duct 16 is prevented. By passing through the external condenser 14, the coolant is condensed and gives up heat to the air stream Fe passing through the external condenser 14. The high pressure coolant then reaches the internal heat exchanger 20 and gives up heat to the low pressure coolant passing inside the internal heat exchanger 20. The coolant then arrives at the two decompression devices 24, 26. The first 24 and the second 26 decompression devices are open so as to allow the passage of the coolant and decompress the latter. At the output of the two decompression devices 24, 26, the coolant is at low pressure and at low temperature.

On the one hand, when the coolant reaches the internal evaporator 28 and passes through it, it picks up heat by passing through it. Because of this, the air stream Fc passing through the internal evaporator 28 is cooled. On reaching the passenger compartment of the vehicle under the action of a blower 48, this cooled air stream makes it possible to reduce the temperature of the air in the passenger compartment. The coolant leaving the internal evaporator 28 then reaches the internal heat exchanger 20, picks up heat from the high pressure coolant, reaches the accumulator 34 and then the compressor 2.

On the other hand, when the coolant reaches the inverter evaporator 38 and passes through it, it picks up heat from the inverter 40 so as to cool it. Then passing through the battery exchanger 42, the coolant picks up heat from the air stream Fu circulating inside the heat treatment unit U. This duly cooled air stream Fu makes it possible to lower the temperature of the battery 100 when it comes into contact therewith.

Once the coolant leaves the battery exchanger 42, it reaches the internal heat exchanger 20, passes through it then circulates through the accumulator 34 and finally arrives back at the compressor 2.

In winter climatic conditions, the battery 100 and the passenger compartment of the vehicle need to be heated. For this, the electric heating device 46 is implemented and heats the air stream Fu circulating inside the heat treatment unit U. When it comes into contact with the battery 100, this hot air stream Fu makes it possible to increase the temperature of the battery 100. The electrical energy used by the electric heating device 46 in the form of heat energy is also involved in implementing the air conditioning loop B.

The coolant, at high pressure and high temperature because of the compression from the compressor, passes through the first three-way valve 6 then passes through the internal condenser 8. The first three-way valve 6 therefore prevents the passage of the coolant to the bypass channel 10. Inside the internal condenser 8, the refrigerant gives up heat to the air stream Fc passing through the air conditioning installation C, this air stream Fc makes it possible to increase the temperature of the air in the passenger compartment. The coolant then circulates through the second three-way valve 12 and bypasses the external condenser 14 via the bypass duct 16. The second three-way valve 12 therefore prevents the passage of the coolant to the external condenser 14. The coolant then passes through the internal heat exchanger 20 then reaches the two decompression devices 24, 26.

The coolant passing through the first decompression device 24 changes to the low pressure and low temperature state then reaches the inverter evaporator 38. Given the great heat dissipation of the inverter 40 in its operation, it is always necessary to cool it, even in winter conditions. Thus, the coolant passing through the inverter evaporator 38 picks up heat from the inverter 40 and makes it possible for the latter to be cooled.

In order to ensure optimum operation of the air conditioning loop B, that is to say obtain an optimum performance coefficient, the heat energy of the electric heating device 46 is used to heat the coolant passing through the battery exchanger 42. In other words, the electrical energy drawn from the battery 100 by the electric heating device 46 is both used for the battery 100 heating function and for the energy input function for the air conditioning loop B in order to ensure an efficient thermodynamic cycle. In practice, the energy in the form of heat, given up by the coolant at the internal condenser 8 to heat the air in the passenger compartment, has to be recovered to complete the thermodynamic cycle of the coolant when it circulates inside the air conditioning loop B. Given that the outside air is at low temperature (winter climatic conditions), it cannot supply the energy the coolant needs to terminate its thermodynamic cycle. The energy input therefore comes from the electric heating device 46.

Consequently, the coolant passing through the battery exchanger 42 picks up heat from the electric heating device 46 then passes through the internal heat exchanger 20, the accumulator 34 and arrives back at the compressor 2.

The coolant passing through the second decompression device 26 reaches the internal evaporator 28 in which it picks up heat from the air stream Fc circulating inside the air conditioning installation C. In order to minimize the electrical consumption of the air conditioning loop B, that is to say of the compressor 2, the air conditioning installation C operates in air recycling mode, that is to say that the air stream Fc circulating inside the air conditioning installation C comes from the passenger compartment of the vehicle and not from outside. At the output of the internal evaporator 28, the coolant passes through the internal heat exchanger 20 then the accumulator 34 and finally the compressor 2. This recycling mode of operation of the air conditioning installation C is chosen for the following reasons.

The heat conditioning system according to the invention makes it possible to reduce the electrical consumption of the battery while providing heating for the battery and for the air in the passenger compartment. To this end, in winter climatic conditions, the electric heating device 46 and the air conditioning loop B are implemented and the air conditioning installation C operates in recycling mode. Thus, the more the air conditioning loop C operates, the more the air in the passenger compartment is heated up. Because of this, the temperature of the air in the passenger compartment gradually becomes high enough for the air in the passenger compartment to be able to become a source of heat energy for the air conditioning loop B. This source of energy is drawn from the air in the passenger compartment via the second heat exchanger 28. In practice, the coolant picks up the heat from the air in the passenger compartment when it passes through the internal evaporator 28. Consequently, the electrical consumption of the electric heating device 46 is reduced as the air in the passenger compartment is heated up. In other words, the more the air in the passenger compartment is heated up, the more this air replaces the heat energy input by the electric heating device 46 for the thermodynamic cycle of the coolant. To do this, the temperature of the air in the passenger compartment is measured via a temperature sensor. Ultimately, the electric heating device 46 consumes only the electrical energy needed to heat the battery 100 and the air conditioning loop B operates as a heat pump using the heat energy in the air that it heats up.

By combining the heat conditioning system according to the invention with the air conditioning installation C operating in recycling mode, the air in the passenger compartment is maintained at the desired temperature, the temperature of the battery 100 remains constant and the consumption of the electrical energy of the battery is minimal. Furthermore, since the internal evaporator 28 is operating, the humidity created by the breathing of the passengers in the vehicle is eliminated by condensation of the water at this internal evaporator 28, this eliminating the risk of the windscreen misting up when the air conditioning installation C is in recycling mode.

Figure 2:
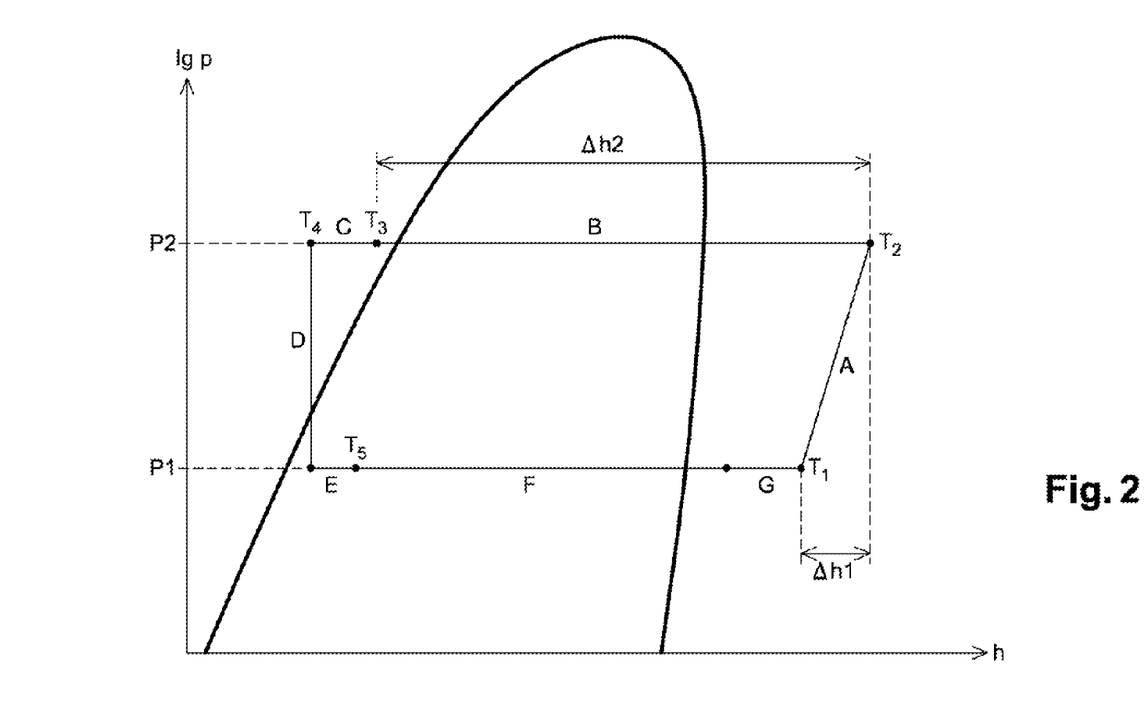
FIG. 2 represents the thermodynamic cycle of the coolant of the air conditioning loop of the system of FIG. 1

FIG. 2 illustrates the thermodynamic cycle of the coolant when the air conditioning loop B is implemented for winter climatic conditions. This cycle represents the enthalpy h as a function of pressure P.

At the input of the compressor 2, the fluid is at a temperature T1 and at a pressure P1, here considered to be the low pressure. At the output of the compressor 2, and therefore once compressed, the coolant is at a temperature T2 greater than T1 and at a pressure P2 greater than PL. The pressure P2 is considered to be the high pressure. This compression of the coolant corresponds to a step A of the thermodynamic cycle.

When the coolant passes through the internal condenser 8, it gives up heat to the air stream Fc of the air conditioning installation C and its temperature drops to a temperature T3 (step B). Then, passage inside the internal heat exchanger 20 lowers the temperature of the coolant to a value T4 (step C). Between the temperatures T2 and T4, the pressure of the coolant remains constant.

The pressure of the coolant passing through the first decompression device 24 drops to the value P1 (step D). While passing through the inverter evaporator 38 (step E), the fluid picks up heat from the inverter 40 and its temperature increases to a temperature T5. Then, the temperature of the coolant increases again to a temperature T6 by passing through the battery evaporator 42 (step F). Finally, the coolant reverts to the temperature T1 after its passage through the internal heat exchanger 20 (step G).

FIG. 2 illustrates the energy saving produced by using the electric heating device 46 with the air conditioning loop B. The energy $\Delta\eta 1$ supplied by the compressor 2 to compress the coolant is less than the energy Ah2 released by the internal condenser 8 to heat the passenger compartment. This means that the electric compressor 2 consumes less energy than it restores through the release of heat via the internal condenser 8. An input of energy is therefore needed to produce the complete thermodynamic cycle of the coolant. Now, since the outside air in winter conditions has a temperature that is too low to input the energy needed to accomplish the thermodynamic cycle, the use of the electric heating device 46 makes it possible to overcome this. Since the electric heating device 46 is implemented to heat the battery, the quantity of energy delivered by the electric heating device 46 is both used to heat the battery and to input the missing energy to the coolant to complete its thermodynamic cycle. Thus, there is no need to add another source of energy to the air conditioning loop B. The electrical consumption of the battery 100 is therefore reduced while ensuring the heating of the battery 100 and of the air in the passenger compartment.

Figure 3:
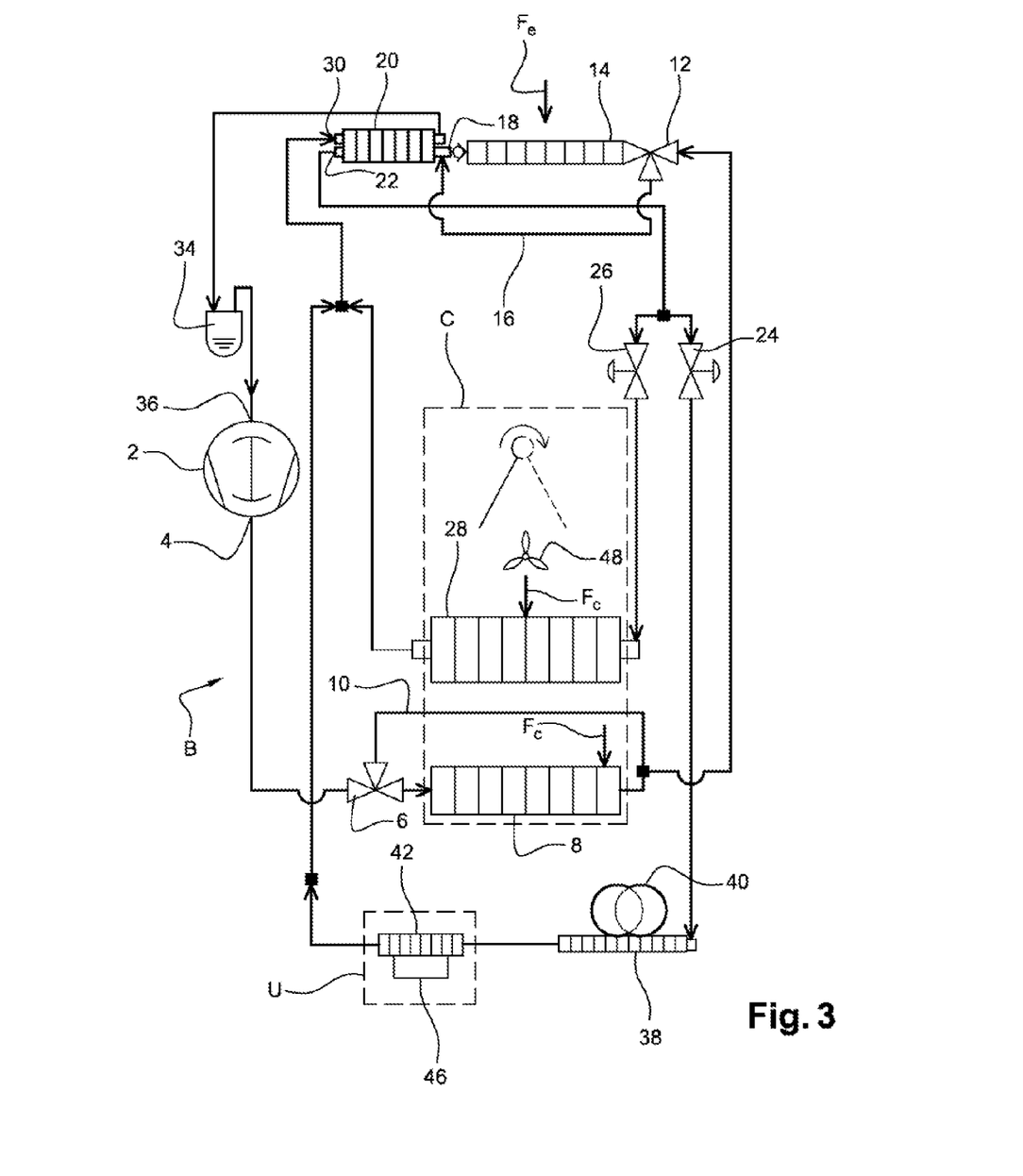
FIG. 3 represents a second embodiment of a heat conditioning system according to the invention

FIG. 3 illustrates a second embodiment of the heat conditioning system according to the invention. In this embodiment, the components of the air conditioning loop B are identical to those of the first embodiment illustrated in FIG. 1. The particular feature of this embodiment is the direct heat exchange between the battery which is not represented and the battery evaporator 42 and the electric heating device 46.

The heat treatment unit U houses the battery evaporator 42 and the electric heating device 46. Unlike in the embodiment of FIG. 1, the battery which is not represented is in contact with the battery evaporator 42. Thus, the heat exchange between the coolant and the battery is done directly. Furthermore, the electric heating device 46 is in contact with the battery evaporator 42. More specifically, the electric heating device 46 is in direct contact with the battery evaporator 42 and is not in direct contact with the air conditioning loop B.

Figure 4:
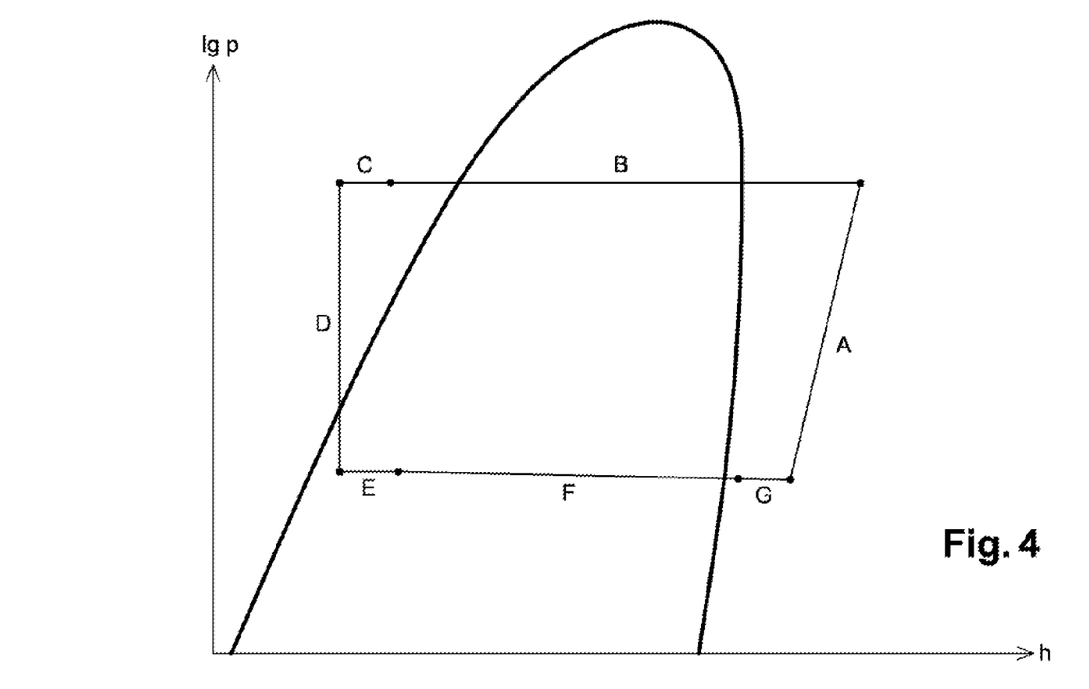
FIG. 4 represents the thermodynamic cycle of the coolant of the air conditioning loop of the system of FIG. 3

FIG. 4 illustrates the thermodynamic cycle of the coolant for the heat conditioning system of FIG. 3 when the heating of the air in the passenger compartment and of the battery are required.

The step A represents the compression of the coolant inside the compressor 2. The step B represents the heat exchange between the air stream passing through the air conditioning installation C and the coolant passing through the internal condenser 8. The step C represents the heat exchange inside the internal heat exchanger 20. The step D represents the decompression of the fluid carried out by the first decompression device 24. The step E represents the exchange of heat between the inverter 40 and the coolant through the inverter evaporator 38. The step F represents the exchange of heat between the electric heating device 46 and the coolant through the battery evaporator 42. Finally, the step G represents the exchange of heat inside the internal heat exchanger 20.

Figure 5:
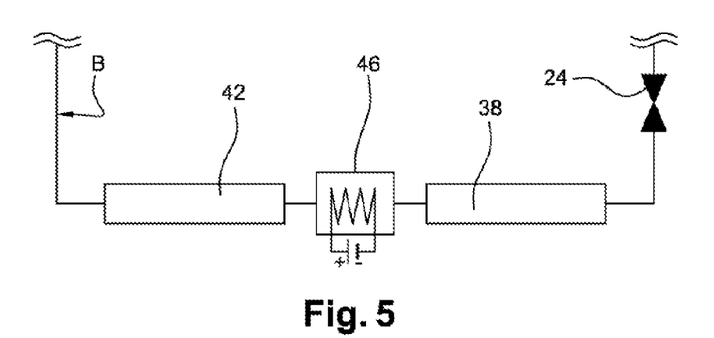
FIG. 5 represents a variant of the second embodiment

FIG. 5 illustrates a variant of the second embodiment in which the electric heating device 46 is directly in contact with the air conditioning loop B. This figure illustrates only the elements of the air conditioning loop B that are arranged between the first decompression device 24 and the internal heat exchanger 20 for reasons of legibility of the figure. The electric heating device 46 is located within the air conditioning loop B downstream of the inverter evaporator 38 according to the direction of travel of the coolant inside the air conditioning loop B, and more specifically between the inverter evaporator 38 and the battery exchanger 42. In this variant embodiment, the evaporation of the coolant is done via the input of heat from the inverter 38 and the input from the electric heating device 46. Consequently, the input of heat for the battery is produced by the coolant via the battery exchanger 42. Thus, this battery exchanger 42 operates as a condenser since the coolant passing through it gives up heat to the battery.

Figure 6:
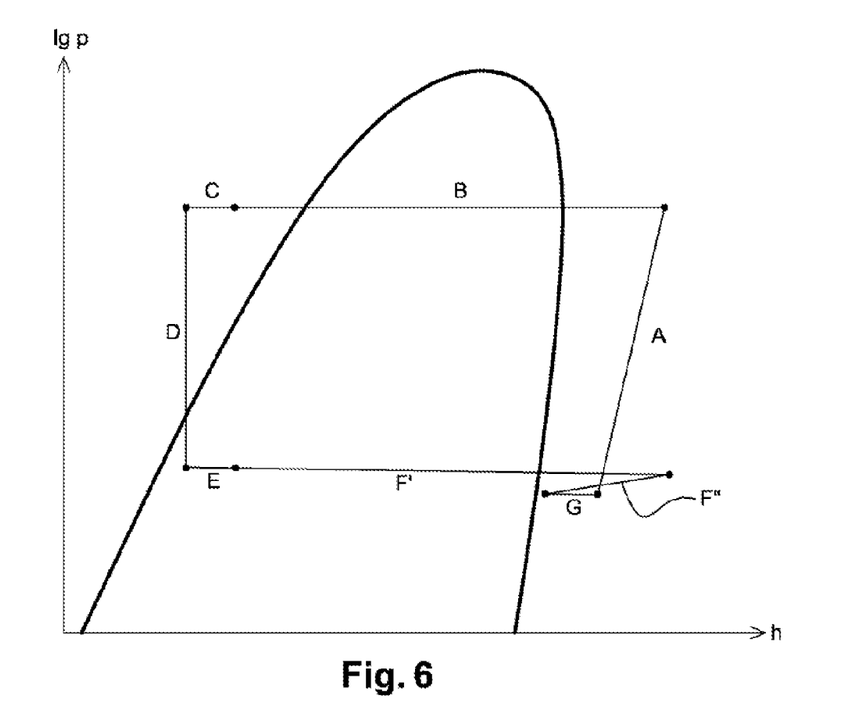
FIG. 6 represents the thermodynamic cycle of the coolant of the air conditioning loop of the system of FIG. 5

FIG. 6 illustrates the thermodynamic cycle of the coolant for the heat conditioning system of FIG. 5 when the heating of the air in the passenger compartment and of the battery are required.

The steps A, B, C, D, E and G are identical to those of FIG. 4. This is understood from the fact that the architecture of the air conditioning loop B between the compressor 2 and the inverter evaporator 38 is identical.

The step F' represents the heat exchange between the electric heating device 46 and the coolant. Here, the coolant picks up the heat from the electric heating device 46 and increases its temperature. Although the electric heating device 46 according to this variant is not in direct contact with the battery, it still participates in its heating up via the air conditioning loop B. In practice, since the coolant is heated by the electric heating device 46, it gives up enough heat to the battery via the battery exchanger 42 for the battery to be heated and retain a constant temperature so as to prolong its life span. The step F″ illustrates this exchange of heat from the coolant to the battery via the battery exchanger 42. It should be noted that the electric heating device 46 supplies enough heat energy to both heat the battery and contribute to the thermodynamic cycle of the coolant.

Figure 7:
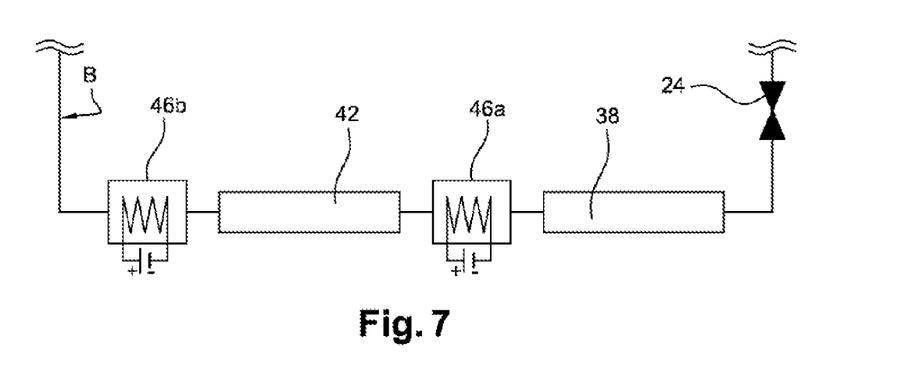
FIG. 7 represents another variant of the second embodiment of the system

FIG. 7 illustrates a variant of the second embodiment in which the electric heating device 46 is divided into two parts, a primary electric heating device 46*a* situated downstream of the inverter evaporator 38 and upstream of the battery exchanger 42 and a secondary electric heating device 42*b* situated downstream of the battery exchanger 42.

Figure 8:
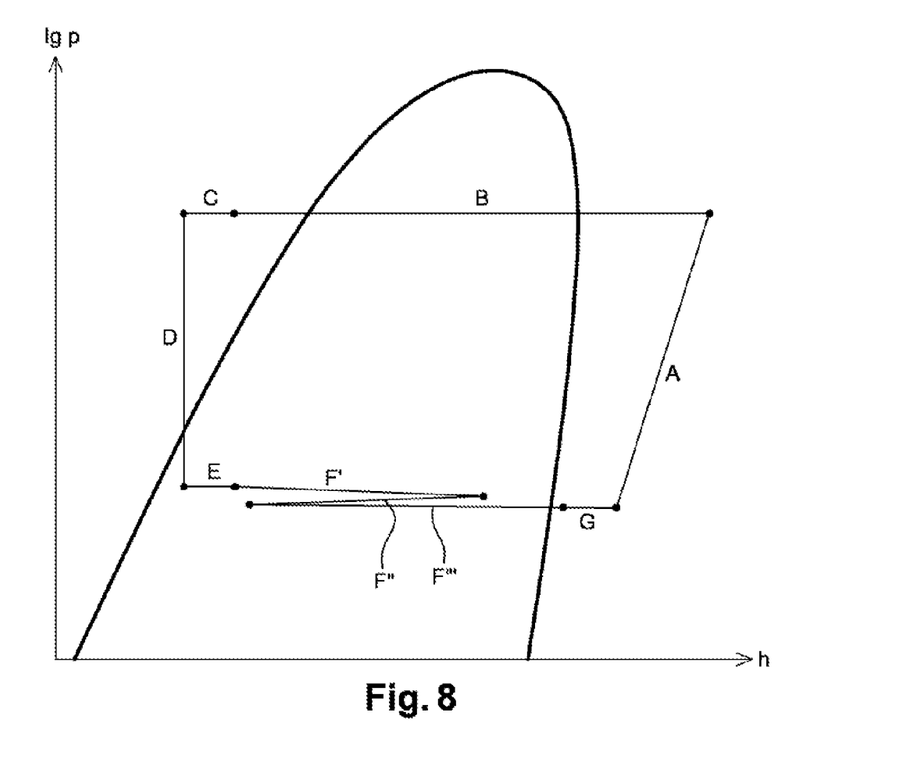
FIG. 8 represents the thermodynamic cycle of the coolant of the air conditioning loop of the system of FIG. 7

FIG. 8 illustrates the thermodynamic cycle of the coolant for the heat conditioning system of FIG. 7 when the heating of the air in the passenger compartment and of the battery are required.

The steps A, B, C, D, E, F′, F″ and G are identical to those of FIG. 6. This is understood from the fact that the architecture of the air conditioning loop B between the compressor 2 and the inverter evaporator 38 is identical. In the step F′, the heating of the coolant is produced by the primary electric heating device 46*a*. In the step F‴, the heating of the coolant is produced by the secondary electric heating device 46*b*.

Figure 9:
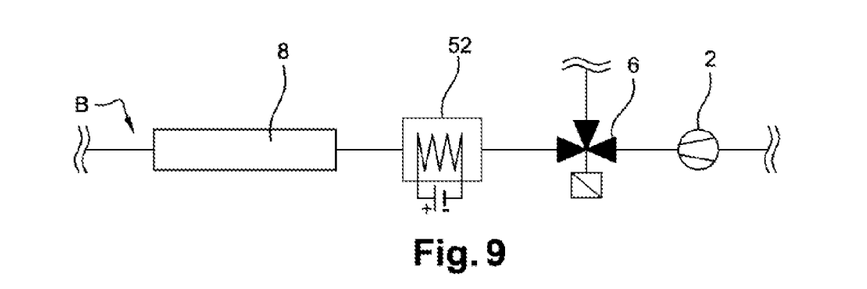
FIG. 9 represents a variant of the first and the second embodiments of the system

FIG. 9 illustrates a variant that can be applied to the first and the second embodiments. In this variant, an additional electric heating device 52 is located on the air conditioning loop B. More specifically, this additional electric heating device 52 is placed upstream of the internal condenser 8 according to the direction of travel of the coolant inside the air conditioning loop B. The presence of the additional electric heating device 52 makes it possible to supply heat to the coolant just before its passage through the internal condenser 8. Because of this, the dynamic temperature control is facilitated for the coolant. In practice, the additional electric heating device 52 makes it possible to best adjust the quantity of heat required to heat the air stream Fc passing through the internal condenser 8, when the heat supplied by the work of the compressor 2 is not sufficient.

FIG. 9 provides a simplified illustration of the portion of the air conditioning loop B comprising an additional electric heating device 52 upstream of the internal condenser 8.

Figure 10:
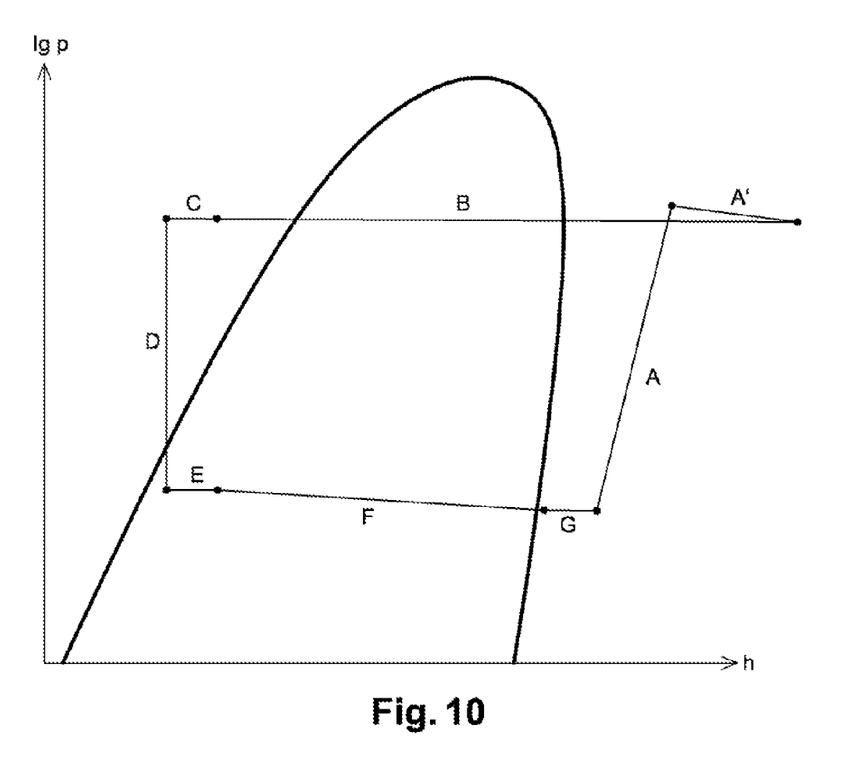
FIGS. 10, 11 and 12 represent the thermodynamic cycle of the coolant of the air conditioning loop of the system comprising the variant of FIG. 9.
Figure 11:
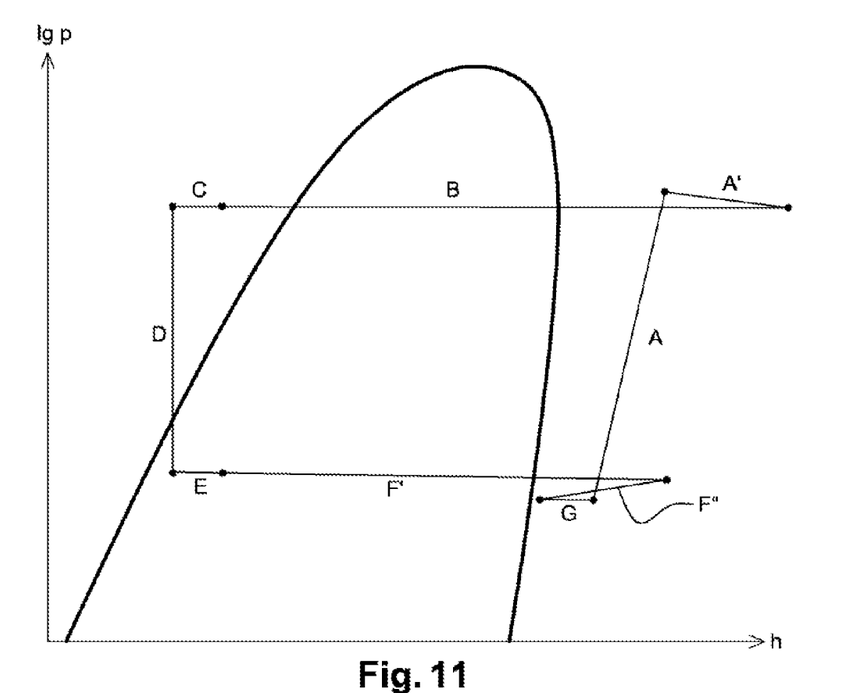
Figure 12:
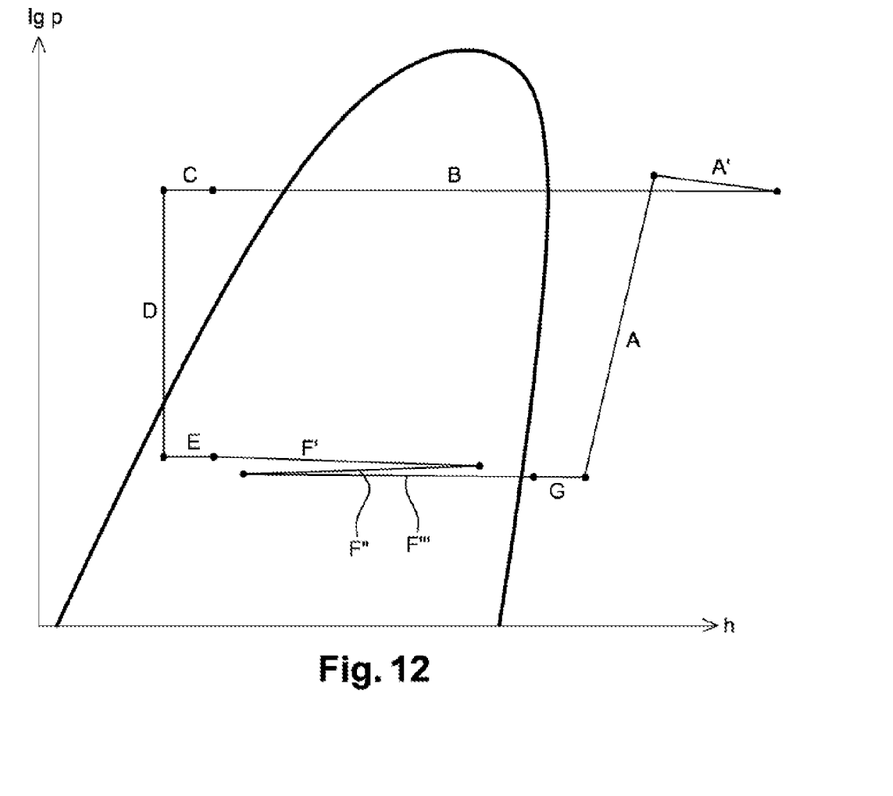

FIGS. 10, 11, 12 illustrate the thermodynamic cycle of the coolant for the heat conditioning system of FIGS. 3, 5 and 7 respectively when the heating of the air in the passenger compartment and of the battery are required.

In FIG. 10, an additional phase A′, between the phase A and the phase B of FIG. 4, illustrates the heating of the coolant by the additional electric heating device 52. Consequently, the phase B in which the air stream Fc of the air conditioning installation C is heated corresponds to a delivered heat energy that is greater than the phase B of FIG. 4.

In FIG. 11, the phase A is that of the compression of the coolant. The heating of the coolant by the additional electric heating device 52 is represented by the phase A′. The loss of heat from the coolant at the internal condenser 8 is the phase B. The phase C illustrates the passage of the fluid in the internal heat exchanger 20. The phase D illustrates the decompression of the coolant by the first decompression device 24 and the phase E corresponds to the heating of the coolant by the heat of the inverter 38. The phase F′ corresponds to the heating of the coolant by the electric heating device 46, the phase F″ is the phase in which the fluid gives up heat to the battery via the battery evaporator 42 and the phase G illustrates the passage of the fluid in the internal heat exchanger 20. FIG. 10 shows how the quantity of heat delivered to the air stream Fc of the air conditioning installation C (phase B) is greater than that illustrated in FIG. 6.

Unlike FIG. 8, FIG. 12 shows the additional phase A′ due to the additional electric heating device 52.

The invention claimed is:

1. A heat conditioning system for a motor vehicle comprising: an air conditioning loop comprising a coolant, a compressor, at least two heat exchangers and at least one decompression device, wherein the coolant flows in a loop through the compressor, the at least two heat exchangers and the at least one decompression device; and a heat treatment unit of a battery comprising a heat treatment means, wherein one of the at least two heat exchangers is contained within the heat treatment unit and is linked to the battery, wherein the heat treatment means and the one of the at least two heat exchangers separately exchange heat directly with the coolant circulating through the air conditioning loop; and wherein the heat treatment means and the and the one of the at least two heat exchangers exchange heat with the battery, wherein the heat treatment means comprises a secondary electric heating device and further comprises a primary electric heating device situated upstream of the one of the at least two heat exchangers and downstream of one of the at least one decompression device such that the coolant flows consecutively through the one of the at least one decompression device, the primary electric heating device, the one of the at least two heat exchangers, and the secondary electric heating device, wherein the air conditioning loop further comprises an inverter evaporator, wherein the air conditioning loop is arranged such that the primary electric heating device is positioned downstream from the inverter evaporator and upstream from the one of the at least two heat exchangers such that the coolant flows consecutively through the inverter evaporator, the primary electric heating device, and the one of the at least two heat exchangers.

2. The system as claimed in claim 1, in which the heat treatment means is situated upstream in the direction of travel of the coolant relative to the one of the at least two heat exchangers such that the coolant flows consecutively through the one of the at least two heat exchangers and the heat treatment means.

3. They system as claimed in claim 1, in which the heat treatment means is situated upstream in the direction of travel of the coolant relative to the one of the at least two heat exchangers such that the coolant flows consecutively through the one of the at least two heat exchangers and the heat treatment means.

4. The system as claimed in claim 1, in which the heat treatment means is an electric heating device.

5. The system as claimed in claim 1, in which an additional heat treatment means is in contact with the air conditioning loop.

6. A heat conditioning system for a motor vehicle comprising: an air conditioning loop comprising a coolant, a compressor, at least two heat exchangers and at least one decompression device, wherein the coolant flows in a loop through the compressor, the at least two heat exchangers and the at least one decompression device; and a heat treatment unit of a battery comprising a heat treatment means, wherein one of the at least two heat exchangers is contained within the heat treatment unit and is linked to the battery, wherein the heat treatment means comprises a primary electric heating device and a secondary electric heating device, and wherein the one of the at least two heat exchangers contained within the heat treatment unit is situated downstream of the primary electric heating device and upstream of the secondary electric heating device in the direction of travel of the coolant circulating through the air conditioning loop such that the coolant circulating through the air conditioning loop flows consecutively through the primary electric heating device the one of the at least two heat exchangers, and the secondary electric heating device each contained within the heat treatment unit, wherein the heat treatment means exchanges heat directly with the coolant circulating through the air conditioning loop; and wherein the heat treatment means and the one of the at least two heat exchangers is contained within the heat treatment unit and is linked to the battery exchanges heat with the battery, wherein the air conditioning loop further comprises an inverter evaporator, wherein the air conditioning loop is arranged such that the primary electric heating device is positioned downstream from the inverter evaporator and upstream from the one of the at least two heat exchangers such that the coolant flows consecutively through the inverter evaporator, the primary electric heating device, the one of the at least two heat exchangers, and the secondary electric heating device, wherein the inverter evaporator is positioned downstream of the at least one decompression device such that the coolant flows consecutively through the at least one decompression device, the inverter evaporator, the primary electric heating device, the one of the at least two heat exchangers, and the secondary electric heating device.

7. The system as claimed in claim 6, in which the one of the at least two heat exchangers is a condenser linked to the battery.

\* \* \* \* \*